United States Patent
Shaklee et al.

[19]

[11] Patent Number: 6,034,709

[45] Date of Patent: Mar. 7, 2000

[54] BI-DIRECTIONAL SWEEPING FOR MONOCHROME CRT PRINTERS

[75] Inventors: Kerry L. Shaklee, Brighton; Daniel C. O'Brien, Conifer; Kurt A. Leniger, Littleton; Gary L. Brackett, Littleton; Richard W. Denny, Littleton, all of Colo.

[73] Assignee: Sienna Imaging Inc., Englewood, Colo.

[21] Appl. No.: 09/118,486

[22] Filed: Jul. 17, 1998

[51] Int. Cl.[7] .............................. G09G 1/04; H01J 29/70; H01J 29/72

[52] U.S. Cl. ......................... 347/226; 347/229; 347/250; 347/254; 347/231; 315/370

[58] Field of Search .................... 315/367, 370, 315/385, 386, 393, 394; 347/226, 229, 231, 235, 250, 254; 348/205, 206, 440

[56] References Cited

U.S. PATENT DOCUMENTS

| | | | |
|---|---|---|---|
| 4,358,789 | 11/1982 | Confer | 358/140 |
| 4,680,599 | 7/1987 | Wertz et al. | 340/744 |
| 5,084,656 | 1/1992 | Sturm et al. | 315/364 |
| 5,184,154 | 2/1993 | Shaklee | 346/110 R |
| 5,239,243 | 8/1993 | Rothe et al. | 315/367 |
| 5,652,482 | 7/1997 | Tripod | 315/370 |

*Primary Examiner*—Edward P. Westin
*Assistant Examiner*—Nikita Wells
*Attorney, Agent, or Firm*—James R. Young

[57] ABSTRACT

Disclosed is a photographic printer with bi-directional sweeping of a monochrome CRT to expose a photosensitive medium. Image data from a host system is received by the printer and stored in a data drive system. The data drive system converts the data into a series of rows of dot row data to produce the appropriate image desired. Linear deflection amplifiers sweep the CRT's electron beam across the face of the CRT to expose the medium utilizing the dot row data. The present invention sweeps and writes data bi-directionally, eliminating the retrace period associated with sweeping and writing in one direction, and without any hold periods once printing starts. The data in every other dot row is processed in reverse order so that the dot row data utilized in the reverse writing sweep will be exposed onto the medium in proper relationship to the rows written above and below it.

30 Claims, 5 Drawing Sheets

BI-DIRECTIONAL SWEEPING FOR MONOCHROME CRT PRINTERS

FIELD OF THE INVENTION

This invention relates to printers for computer systems and more particularly to Cathode Ray Tube (CRT) display systems within such printers. Even more particularly, the invention relates to bi-directional sweeping of the CRT electron beam within a monochrome CRT display system of such a printer.

BACKGROUND OF THE INVENTION

Photographic process printers that utilize CRT's for exposing a photosensitive medium typically use linear deflection amplifiers to sweep the CRT electron beam across the face of the CRT. A deflection cycle normally consists of a sweep, retrace, and hold period. During the active sweep period, the CRT is unblanked and the CRT electron beam is driven horizontally at a particular vertical position while being modulated with image data to expose the medium. During the retrace period, the CRT is blanked and the CRT electron beam is returned to a home position to wait for the start of the next sweep. Thus, the sweep and retrace periods are typically fixed time intervals. The CRT electron beam is then held in the home position for the hold period until a new sweep is initiated. Therefore, the hold period may be a variable time interval dependent on the print speed. The duty cycle thus has two potential periods of off-duty time where the CRT is blanked: the retrace period and the optional hold period. These off-duty periods slow down the print process considerably.

It is thus apparent that there is a need in the art for an improved sweep method that can reduce the off-duty time in order to optimize the duty cycle and increase the print speed. There is also a need in the art to eliminate the hold period after every sweep to further optimize the duty cycle and further increase the print speed. The present invention meets these and other needs in the art.

SUMMARY OF THE INVENTION

It is an aspect of the present invention to increase the duty cycle of a monochrome CRT photographic printer by sweeping bi-directionally, eliminating the retrace period associated with sweeping in one direction.

It is another aspect of the invention to increase the duty cycle of a monochrome CRT photographic printer by eliminating the normal hold period after each sweep.

Yet another aspect of the invention is to reverse the order that dot row data, used for modulating the CRT electron beam, is taken such that the dot row data, corresponding to the reverse sweep, is taken in a reverse direction.

Still another aspect of the invention is to blank the CRT electron beam at the end of each bi-directional sweep to allow for turn around of the CRT electron beam.

A further aspect of the invention is to utilize a home position for parking the CRT electron beam only when not printing an image.

A still further aspect of the invention is to drive the CRT electron beam at a constant velocity across the face of the CRT by utilizing look up tables to store values that are used to control beam deflection.

Another aspect of the invention is to align each position on an exposed line on the photosensitive medium exposed in the forward direction, with each corresponding position on the next exposed line on the photosensitive medium exposed in a reverse direction.

The above and other aspects of the invention are accomplished in a photographic printer which uses a monochrome CRT to expose photosensitive medium. One skilled in the art will recognize that the term monochrome means one color, and that different monochrome CRTs used in the present invention may emit light that is white, green, amber, or any number of other colors, and that the light may be emitted in varying intensities, resulting in a gray-scale type effect on the medium.

Image data sent from a host system is received by the photographic printer and stored in a data drive system. The data drive system converts the data to a series of rows of dot row data to produce the desired image. Linear deflection amplifiers are used to sweep the CRT's electron beam across the face of the CRT in a horizontal direction at a fixed vertical position, causing light to be emitted from the face of the CRT, in order to expose the medium with the dot row data. The medium may be located adjacent to the face of the CRT, and advanced in a direction perpendicular to the face of the CRT. The CRT may expose the medium one line at a time, a block at a time, or an entire page at a time, depending upon the type of CRT. Alternatively, there may be optics, such as a lens, between the face of the CRT and the medium that projects the light onto the medium as the medium is advanced in the focal plane of the lens.

The present invention sweeps bi-directionally, forward and reverse, eliminating the long retrace period associated with sweeping in a single direction, and eliminating any hold periods while printing the image. Thus, the duty cycle is increased. The data in every other dot row is taken in reverse order so that the dot row data utilized in the reverse sweep will be exposed onto the medium in proper relationship to the rows above and below it.

The first row of dot row data is displayed during a forward sweep with the CRT unblanked. At the end of the sweep, the CRT is blanked while the horizontal velocity is reversed and a vertical adjustment is made to the medium to bring the next portion of the medium to proper exposure position. The second row of dot row data is displayed in reverse order and is displayed during a reverse sweep with the CRT unblanked. At the end of the second sweep, the CRT is blanked again while the horizontal velocity is reversed and the next vertical adjustment of the medium is made. The next sweep utilizes the next row of dot row data and sweeps in the forward direction, and so on. This procedure of alternating sweep direction, forward and reverse, with dot row data that is taken in forward and reverse order from row to row is followed until all of the dot row data for the image has been utilized.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
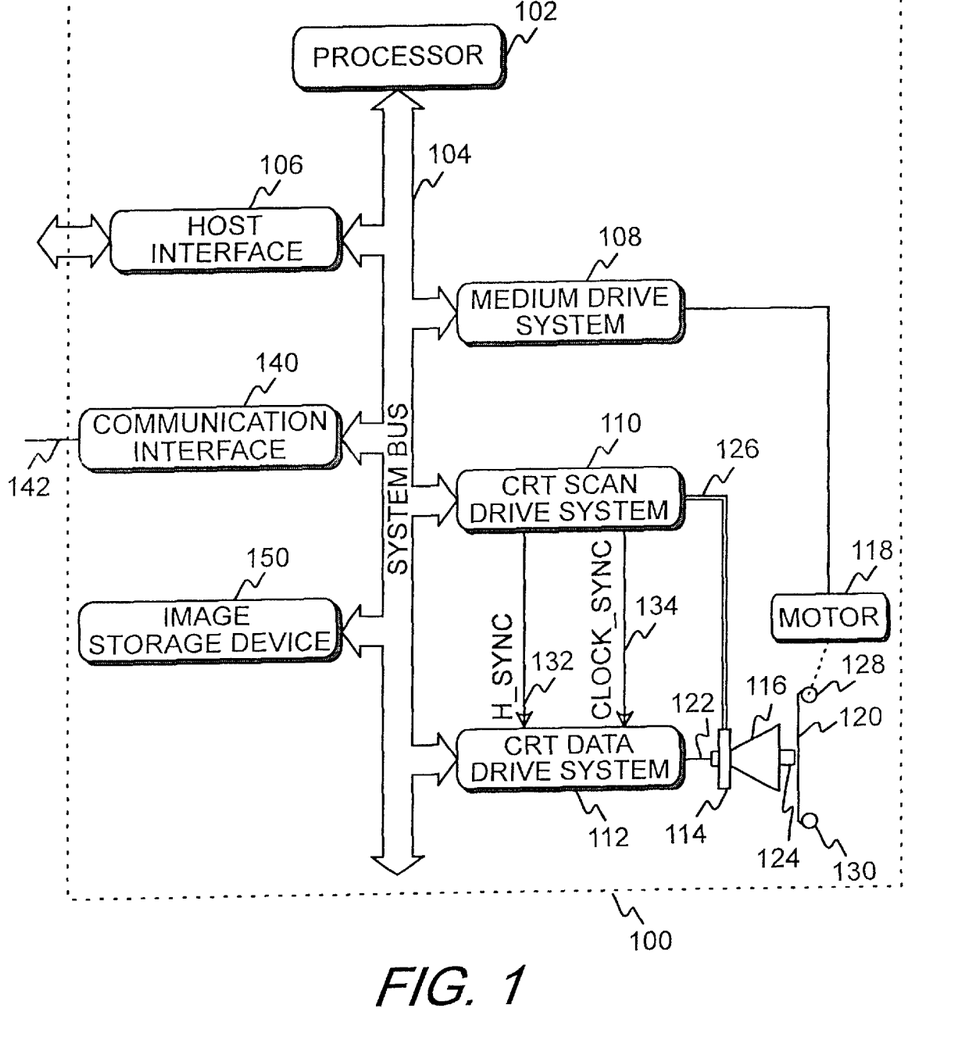
FIG. 1 shows a block diagram of a monochrome photographic printer incorporating the present invention.

FIG. 1 shows a block diagram of a monochrome photographic printer incorporating the present invention. Referring now to FIG. 1, a monochrome photographic printer 100 contains a control digital processing unit 102 which communicates to other components of the system over a system bus 104. During the image acquisition process, control digital processing unit 102 uses a host interface 106 to receive image and control data from a host system (not shown) or from the image storage device 150. Control digital processing unit 102 stores this data in a CRT data drive system 112. The output signal 122 of the CRT data drive system 112 is connected to a CRT 116 and used to modulate the electron beam within CRT 116. Light created when the electron beam strikes the phosphor of CRT 116 is conducted through a CRT fiber optic faceplate 124 to expose medium 120. Medium 120 is photosensitive, recording the image data displayed on CRT 116 and conducted through CRT fiber optic faceplate 124.

During the printing process, deflection of the electron beam of CRT 116 is controlled by a CRT scan drive system 110. In the preferred embodiment of the invention, electron beam deflection of CRT 116 is controlled magnetically by a CRT yoke 114, having a CRT vertical drive and a CRT horizontal drive, which receives output signal 126. Deflection of the electron beam may also be controlled electrostatically by sending output signal 126 to a CRT having electrostatic plates instead of a magnetic yoke.

CRT scan drive system 110 controls the start of each horizontal sweep, and communicates the beginning of active data that will expose the medium to CRT data drive system 112, through an H_SYNC signal 132, and further sends data synchronization information to CRT data drive system 112 through a CLOCK_SYNC signal 134.

Medium 120 is moved by a medium roll 128 which is powered by a motor 118. Motor 118 is operated by a medium drive system 108, which is controlled over system bus 104 by control digital processing unit 102.

A communications interface 140 can be used to input EEPROM (Electrically Erasable Programmable Read Only Memory chip) data into monochrome photographic printer 100, and image storage device 150 can also be used to load EEPROM data. EEPROM data can also be received over host interface 106.

Operation of the system begins when data is received over host interface 106. Control digital processing unit 102 takes the data from host interface 106 and stores the data in CRT drive system 112. CRT drive system 112 converts the image data into a series of rows of dot row data to produce the appropriate image desired. Medium drive system 108 is then used to move medium 120 in front of the phosphor stripe on the face of CRT fiber optic faceplate 124. CRT scan drive system 110 is then activated to move the CRT electron beam across the phosphor stripe in a forward direction while CRT data drive system 112 modulates the CRT electron beam intensity according to the dot row data taken in the forward direction to expose medium 120. Medium 120 is then moved a fixed incremental distance, and the process is repeated in a sweep in the reverse direction for another row of dot row data taken in the reverse order. This process is repeated until all of the dot row data has been processed.

Figure 2:
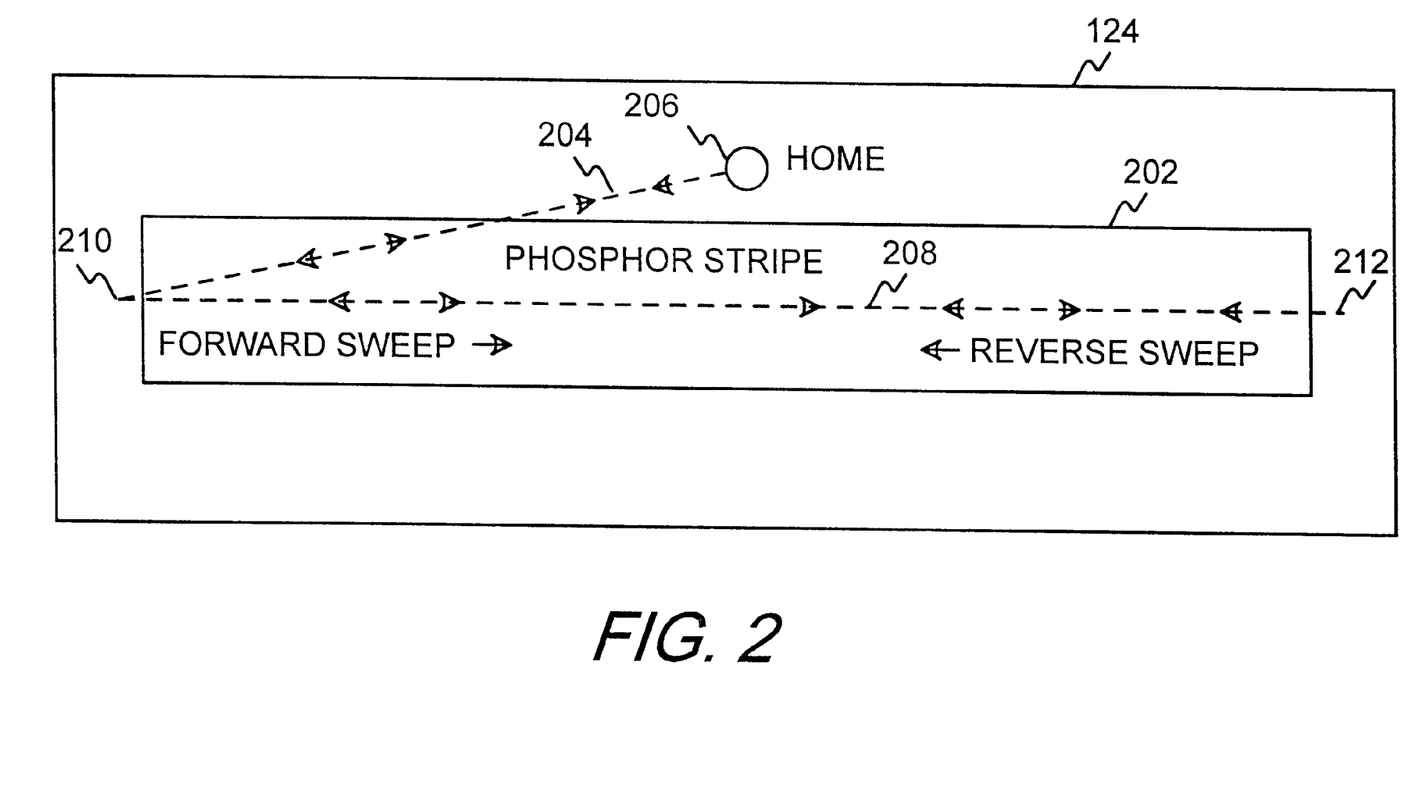
FIG. 2 shows a diagram of the face of the CRT utilizing bi-directional sweep used with the present invention.

FIG. 2 shows a diagram of the face of the fiber optic faceplate, and illustrates the phosphor stripe as well as the bi-directional sweeping of the present invention. Referring now to FIG. 2, CRT fiber optic faceplate 124 contains a phosphor stripe 202. Dotted line 204 shows the CRT electron beam path from a home position 206, prior to the commencement of the photographic print process, to a forward sweep starting position 210 at a left most end of CRT fiber optic faceplate 124, during which the CRT is blanked. At the end of the photographic print process, the CRT electron beam is blanked and follows dotted line 204 from forward sweep starting position 210 back to home position 206. Should the photographic print process end after a forward sweep, then the CRT electron beam would follow a path (not shown in FIG. 2) from a reverse sweep starting position 212 at a right most end of CRT fiber optic faceplate 124 back to home position 206.

Dotted line 208 shows the horizontal sweep lines for the CRT electron beam across the face of CRT 116 (FIG. 1) and CRT fiber optic faceplate 124 for both forward and reverse sweeps. A forward sweep begins at forward sweep starting position 210 and travels horizontally along dotted line 208 across phosphor stripe 202 on CRT fiber optic faceplate 124 during which the output signal 122 of the CRT data drive system 112 is placed at the unblank level and is modulated by dot row data taken in the forward direction causing the electron beam of CRT 116 to be modulated unblanked. At the end of the sweep, the output signal 122 of the CRT data drive system 112 is placed at the blank level causing the electron beam of CRT 116 to carry no current during the turn around time. When another row of dot row data is available for subsequent sweep, a reverse sweep begins at reverse sweep starting position 212 and travels horizontally along dotted line 208 across phosphor stripe 202 on CRT fiber optic faceplate 124 during which output signal 122 of the CRT data drive system 112 is placed at the unblank level and is modulated by dot row data taken in the reverse direction causing the electron beam of CRT 116 to be modulated. At the end of the reverse sweep, the output signal 122 of the CRT data drive system 112 is again placed at the blank level causing the electron beam of CRT 116 to carry no current during the turn around time. The forward and reverse sweeps continue until all of the dot row data for an image has been processed. Though only one dotted line 208 is shown at one vertical location within phosphor stripe 202, forward and reverse sweeps in multiple vertical locations within phosphor stripe 202 are utilized in the preferred embodiment of the invention in order to lengthen the life of CRT 116. Thus, two adjacent lines on medium 120 may not be exposed one after the other. A first line may be exposed at time one, and the line adjacent to it may be exposed at a subsequent time, after exposing other lines. An effective method for sweeping horizontally in multiple vertical locations within a phosphor stripe is disclosed in U.S. Pat. No. 5,184,154 issued to Kerry L. Shaklee on Feb. 2, 1993.

Bi-directional sweeping eliminates the hold periods associated with unidirectional sweeps and the need for a retrace after every unidirectional sweep, thus increasing print speed. By keeping the CRT electron beam in home position 206 during idle periods between printing images, exposure leak is prevented because the CRT electron beam is kept outside phosphor stripe 202, thus the CRT electron beam is incapable of exposing the medium. Also, since the CRT electron beam is in the center of the CRT, power dissipation within the horizontal amplifiers is significantly reduced, thus minimizing thermal dissipation requirements of the deflection amplifiers.

Figure 3:
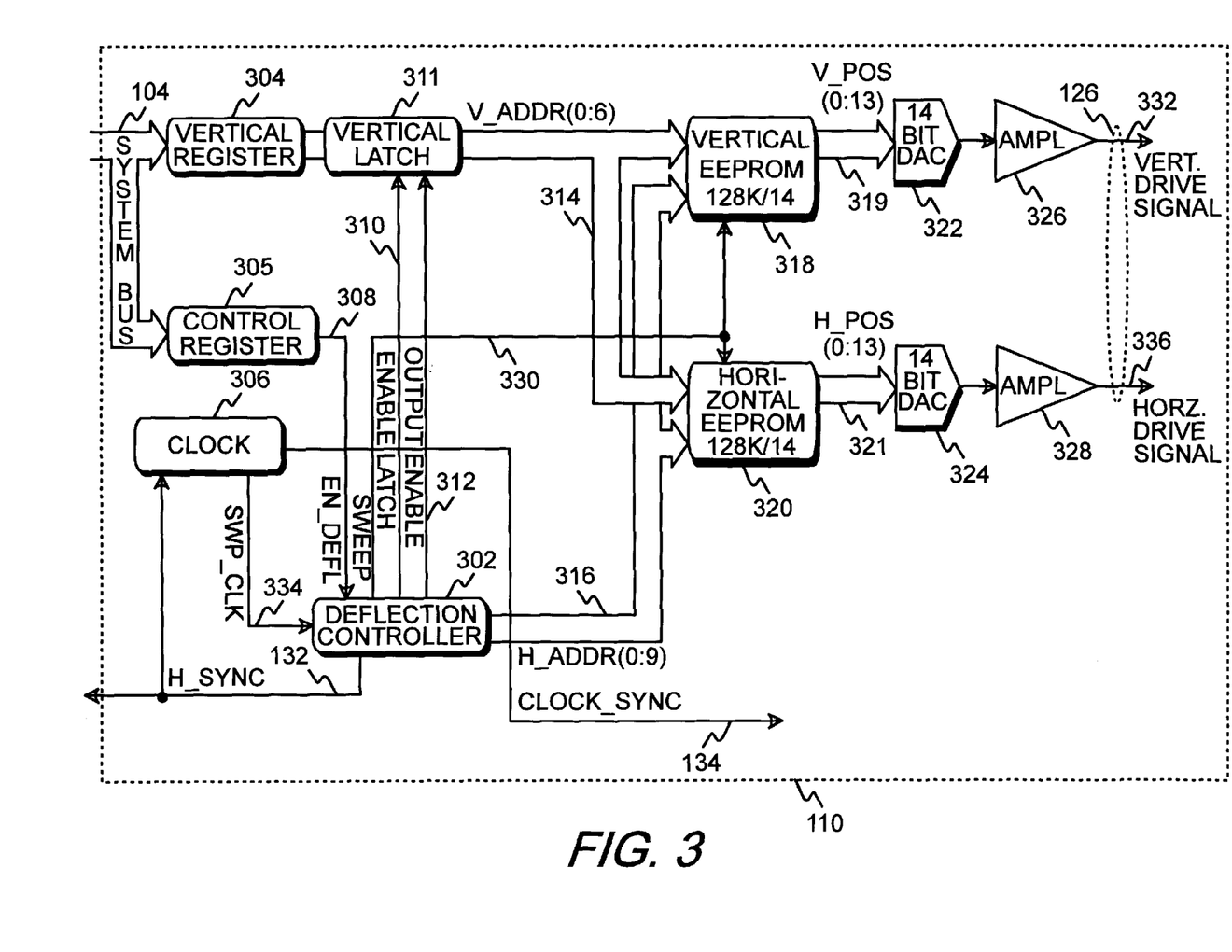
FIG. 3 shows a block diagram of the CRT scan drive system of FIG. 1.

FIG. 3 shows a block diagram of the CRT scan drive system. Referring now to FIG. 3, CRT scan drive system 110 contains a deflection controller 302 which creates the data necessary to cause forward and reverse sweeps of the CRT electron beam, and to place the CRT electron beam into the home position 206 (FIG. 2). Deflection controller 302 generates H_SYNC signal 132 (also shown in FIG. 1) and sends it to CRT data drive system 112 (FIG. 1) and a SWP_CLK signal 334 is generated from a clock 306 and sent to deflection controller 302. Clock 306 sends CLOCK_SYNC signal 134 (also shown in FIG. 1) to CRT data drive system 112.

A vertical register 304 receives a vertical address from control digital processing unit 102 (FIG. 1) over system bus 104 (also shown in FIG. 1). The vertical address is used to select a position within phosphor stripe 202 (FIG. 2) on the face of CRT 116 (FIG. 1). The vertical position of the CRT electron beam within phosphor stripe 202 is changed periodically to lengthen the life of CRT 116. The vertical address is transferred to vertical latch 311 by an enable latch signal 310. The output V_ADDR 314 of the vertical latch 311 is a seven bit bus that is connected to a vertical EEPROM 318. V_ADDR 314 also connects to a horizontal EEPROM 320. Vertical EEPROM 318 and horizontal EEPROM 320 contain look up tables having rows of numbers that are fed to D to A converters that convert the numbers into voltages. For vertical EEPROM 318, the cells in each row of the table are filled with numerical values that establish a vertical position within phosphor stripe 202 (FIG. 2) from which to move the CRT electron beam horizontally across the face of the CRT in a digital fashion. In the preferred embodiment of the invention, there are 13 to 19 vertical positions within phosphor stripe 202.

Figure 5:
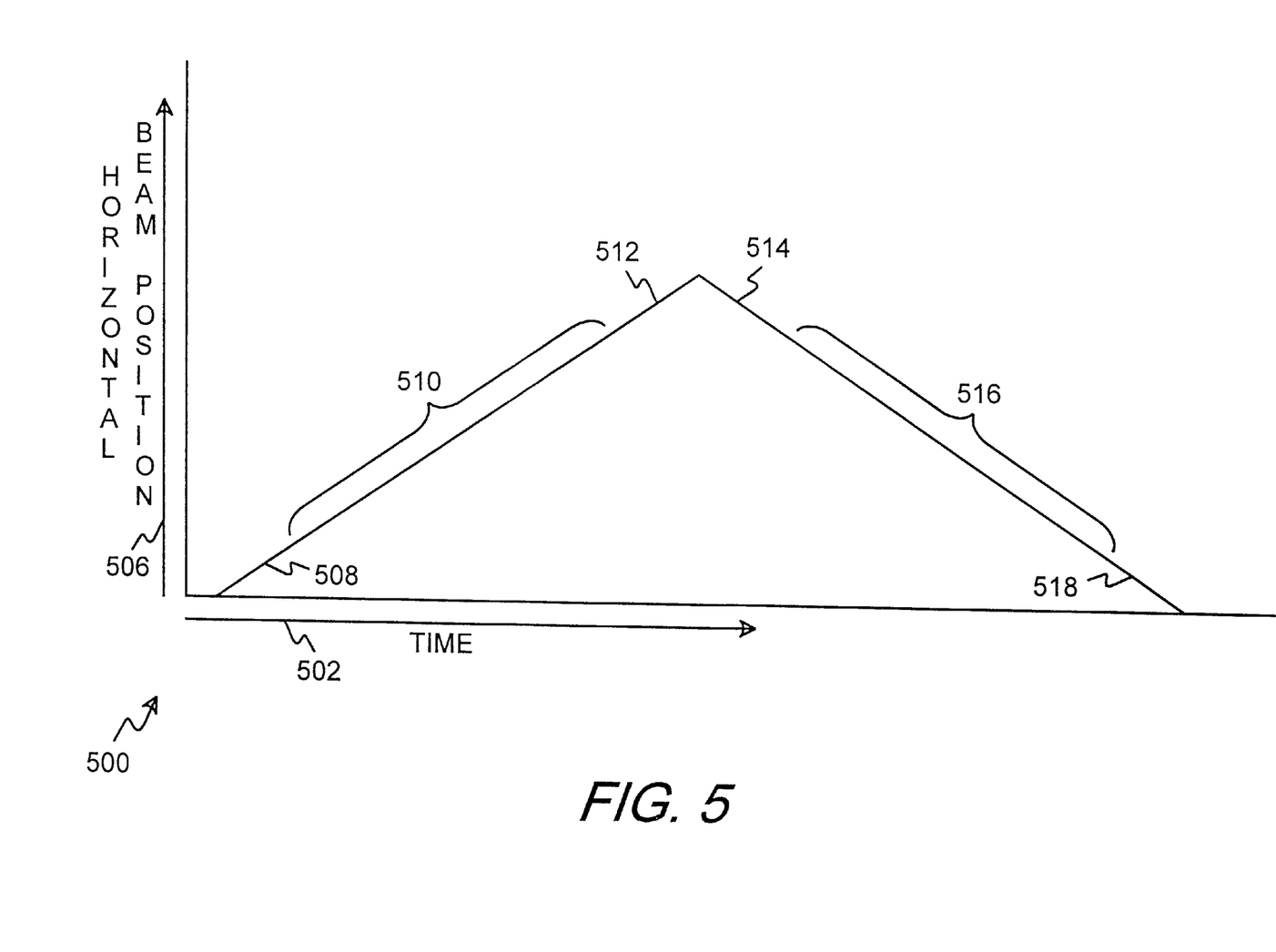
FIG. 5 shows a timing diagram of the CRT electron beam in a forward and reverse sweep position over time.

For horizontal EEPROM 320, the cells in each row of the table contain numerical values that drive the CRT electron beam at a constant velocity across the face of the CRT. A first row contains values for a forward sweep at a first vertical position. The next row contains values for a reverse sweep at the first vertical position. The next row contains values for a forward sweep at a second vertical position, and so on for the remaining rows. These values ensure that the dots that are exposed on medium 120 are aligned from row to row. There should be enough update values in each row of the horizontal look up table to compensate for the inertia of the electrical system to provide a smooth curve as shown in FIG. 5. In the preferred embodiment of the invention, 528 update values are used to move the CRT electron beam across the face of the CRT.

The output of deflection controller 302 is a ten bit H_ADDR bus 316 which is also connected to vertical EEPROM 318 and horizontal EEPROM 320. Deflection controller 302 also outputs a SWEEP signal 330 which indicates whether the CRT electron beam is sweeping in a forward direction or a reverse direction. SWEEP signal 330 is a logic 1 when the CRT electron beam is sweeping forward across the CRT, and is a logic 0 when the CRT electron beam is sweeping in reverse across the CRT.

Data on the V_ADDR bus 314 and the H_ADDR bus 316 are converted by vertical EEPROM 318 into a fourteen bit vertical position signal V_POS 319 which is connected to a fourteen bit D to A converter 322. The output of D to A converter 322 is amplified by an amplifier 326 and connected through output signal 126 (also shown in FIG. 1) to the CRT vertical drive of CRT yoke 114. Data on the V_ADDR bus 314 and the H_ADDR bus 316 are also connected to horizontal EEPROM 320. Horizontal EEPROM 320 converts these two values into a fourteen bit horizontal position value H_POS 321 which is connected to a horizontal position fourteen bit D to A converter 324. The output of D to A converter 324 is amplified by amplifier 328 and connected through output signal 126 to the CRT horizontal drive of CRT yoke 114. The vertical drive signal 332 from amplifier 326 and the horizontal drive signal 336 from amplifier 328 form output signal 126 of the CRT scan drive system 110 (FIG. 1).

Deflection controller 302, vertical EEPROM 318, D to A converter 322, and amplifier 326 thus form a vertical deflection controller circuit which outputs a constant voltage vertical drive signal 332 to hold the electron beam at the same vertical position within phosphor stripe 202 during a sweep. Deflection controller 302, horizontal EEPROM 320, D to A converter 324, and amplifier 328 thus form a horizontal sweep generator circuit which outputs a saw tooth voltage wave form horizontal drive signal 336 for driving the electron beam bi-directionally in forward and reverse directions across phosphor stripe 202.

Figure 4:
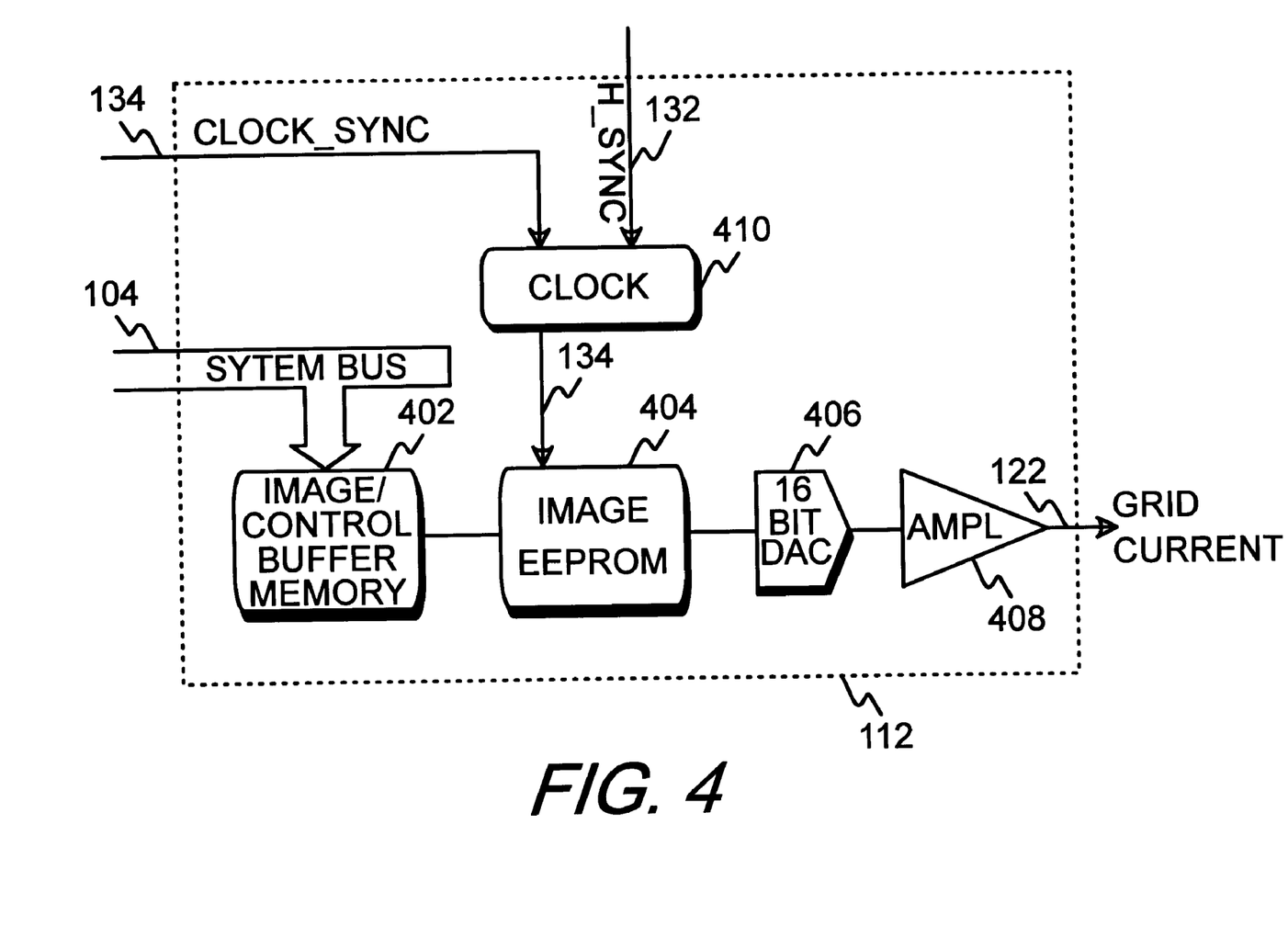
FIG. 4 shows a block diagram of the CRT data drive system of FIG. 1.

FIG. 4 shows a block diagram of the CRT data drive system of FIG. 1. Referring now to FIG. 4, CRT data drive system 112 is shown containing a image/control buffer memory 402. Control digital processing unit 102 (FIG. 1) takes the image data from host interface 106 and converts the image data into a series of rows of dot row data. This data is then sent to image/control buffer memory 402 through system bus 104 (also shown in FIG. 1). For low resolution image data, a line of image data may be repeated in several rows of dot row data to improve the appearance of the final image exposed on the medium.

When a phosphor row is being exposed by the CRT electron beam, the row of data is retrieved from image/control buffer memory 402 and sent to an image EEPROM 404, which translates the data for each position on the row into a number representative of the display intensity needed to expose medium 120 (FIG. 1) at this position. This number is then converted from a digital value to an analog value by D to A converter 406, amplified by amplifier 408, and output signal 122 (also shown in FIG. 1) is used to drive the grid of the CRT to control the intensity of the displayed position.

The order of the image data must be reversed for each reverse sweep. In one embodiment of the invention the image information is loaded into image/control buffer memory 402, in reverse order in every other row. Thus, when each row is retrieved for modulating the CRT electron beam, rows of data in forward order are retrieved for forward sweeps, and rows of data in reverse order are retrieved for reverse sweeps. In the preferred embodiment of the invention, the image data sent to image/control buffer memory 402 is loaded in forward order. As the image data is retrieved for modulating the CRT electron beam, every other row is read in reverse order for each reverse sweep according to SWEEP signal 330 (FIG. 3).

CLOCK_SYNC signal 134 (also shown in FIG. 1) is received in clock 410 and is sent to image EEPROM 404 to determine when to change pixel information. Clock 410 receives H_SYNC signal 132 (also shown in FIG. 1) from CRT scan drive system 110 (FIG. 1) to indicate that the CRT electron beam moving across the face of the CRT has reached the active data position and will begin exposing the medium. CLOCK_SYNC signal 134 and H_SYNC signal 132 synchronize the modulation of the CRT electron beam by CRT data drive system 112 with CRT scan drive system 110 at the beginning of each sweep. This ensures that each horizontal and vertical address in a sweep, in either forward or reverse direction controlled by CRT scan drive system 110, will receive the proper intensity from the CRT electron beam for that location from CRT data drive system 112.

FIG. 5 shows a timing diagram of the CRT electron beam in a forward and reverse sweep position over time. Referring now to FIG. 5, timing diagram 500 shows the horizontal beam position 506 against time 502, which is caused by the saw tooth voltage wave form generated by the horizontal sweep generator circuit. When a forward sweep starts, the CRT electron beam has a ramp up period 508 to overcome inertia. The CRT is blanked during ramp up period 508. The CRT electron beam then moves into a linear period 510 where it is swept across the face of the CRT at a constant velocity. The CRT is unblanked during linear period 510 to expose medium 120 (FIG. 1). The CRT electron beam then moves into a ramp down period 512 to bring the CRT electron beam to a stop. The CRT is blanked during ramp down period 512. This completes a forward sweep.

A reverse sweep starts with ramp up period 514 in which the CRT remains blanked. The CRT electron beam then moves into a linear period 516 where it is swept across the face of the CRT in a reverse direction at a constant velocity. The CRT is unblanked during linear period 516 to expose medium 120. The CRT electron beam then moves into ramp down period 518 to bring the CRT electron beam to a stop. The CRT is blanked during this period. This completes a reverse sweep across the face of the CRT. This process is repeated for each successive forward and reverse sweep until all the image data has been processed to expose medium 120 with the image.

Having described a presently preferred embodiment of the present invention, it will be understood by those skilled in the art that many changes in construction and circuitry and widely differing embodiments and applications of the invention will suggest themselves without departing from the scope of the present invention, as defined in the claims. The disclosures and the description herein are intended to be illustrative and are not in any sense limiting of the invention, defined in scope by the following claims.

What is claimed is:

1. A method for bi-directionally sweeping an electron beam of a monochrome CRT, to illuminate a phosphor area on a face of said monochrome CRT, and to expose a photosensitive medium with light emitted from said face of said monochrome CRT, said method comprising:
    (a) positioning said electron beam at a first vertical position in said phosphor area on said face of said monochrome CRT;
    (b) sweeping said electron beam horizontally inside said phosphor area in a forward direction at said first vertical position;
    (c) modulating said electron beam, during said sweeping of step (b), with a first row of dot row data derived from an image, wherein said first row of dot row data is processed in forward order;
    (d) exposing a first line of said photosensitive medium during said sweeping and modulating of steps (b) and (c);
    (e) positioning said electron beam at a second vertical position inside said phosphor area;
    (f) sweeping said electron beam horizontally inside said phosphor area in a reverse direction at said second vertical position, wherein said reverse direction is opposite said forward direction;
    (g) modulating said electron beam, during said sweeping of step (f), with a second row of dot row data derived from said image, wherein said second row of dot row data is processed in a reverse order opposite said forward order; and
    (h) exposing said second line of said photosensitive medium during said sweeping and modulating of steps (f) and (g).

2. The method for bi-directionally sweeping an electron beam of a monochrome CRT, to illuminate a phosphor area on a face of said monochrome CRT, and to expose a photosensitive medium with light emitted from said face of said monochrome CRT according to claim 1, further comprising the step of:
    (i) repeating steps (a) through (h) for a plurality of additional sweeps, illuminating said phosphor area of said monochrome CRT, at a plurality of vertical positions inside said phosphor area, with said electron beam modulated with a plurality of additional rows of dot row data derived from said image, wherein each of said plurality of additional sweeps alternates between said forward direction and said reverse direction, and further wherein each of said plurality of additional rows of dot row data are processed alternately between said forward order and said reverse order, and further wherein said photosensitive medium is exposed over a block of lines.

3. The method for bi-directionally sweeping an electron beam of a monochrome CRT, to illuminate a phosphor area on a face of said monochrome CRT, and to expose a photosensitive medium with light emitted from said face of said monochrome CRT according to claim 2, further comprising the step of:
    (j) moving said photosensitive medium to place a second block of lines of said photosensitive medium in position for exposure by said light emitted from said face of said monochrome CRT;
    (k) repeating steps (a) through (j) until all of said additional rows of dot row data derived from said image have been processed, and
    (l) repeating step (k) for a plurality of images.

4. The method for bi-directionally sweeping an electron beam of a monochrome CRT, to illuminate a phosphor area on a face of said monochrome CRT, and to expose a photosensitive medium with light emitted from said face of said monochrome CRT according to claim 1, wherein step (e) is replaced by the following new step (e), step (f) is replaced by the following new step (f), and a new step (i) is added:
    (e) moving said photosensitive medium to place a second line of said photosensitive medium in position for exposure by said light emitted from said face of said monochrome CRT;
    (f) sweeping said electron beam horizontally inside said phosphor area in a reverse direction at said first vertical position, wherein said reverse direction is opposite said forward direction; and
    (i) moving said photosensitive medium to place a next line of said photosensitive medium in position for exposure by said light emitted from said face of said monochrome CRT.

5. The method for bi-directionally sweeping an electron beam of a monochrome CRT, to illuminate a phosphor area on a face of said monochrome CRT, and to expose a photosensitive medium with light emitted from said face of said monochrome CRT according to claim 4, further comprising the step of:

(j) repeating steps (a) through (i) for a plurality of additional sweeps, illuminating said phosphor area of said monochrome CRT, at said first vertical position inside said phosphor area, with said electron beam modulated with a plurality of additional rows of dot row data derived from said image, wherein each of said plurality of additional sweeps alternates between said forward direction and said reverse direction, and further wherein each of said plurality of additional rows of dot row data are processed alternately between said forward order and said reverse order, and further wherein said photosensitive medium is moved and exposed at a plurality of additional lines.

6. The method for bi-directionally sweeping an electron beam of a monochrome CRT, to illuminate a phosphor area on a face of said monochrome CRT, and to expose a photosensitive medium with light emitted from said face of said monochrome CRT according to claim 5, further comprising the steps of:

(k) repeating steps (a) through (j) until all of said additional rows of dot row data derived from said image have been processed, and (l) repeating step (k) for a plurality of images.

7. The method for bi-directionally sweeping an electron beam of a monochrome CRT, to illuminate a phosphor area on a face of said monochrome CRT, and to expose a photosensitive medium with light emitted from said face of said monochrome CRT according to claim 6, wherein step (j) further comprises steps (j1) and (j2):

(j1) blanking said monochrome CRT when said image is complete; and (j2) parking said electron beam in a home position.

8. The method for bi-directionally sweeping an electron beam of a monochrome CRT, to illuminate a phosphor area on a face of said monochrome CRT, and to expose a photosensitive medium with light emitted from said face of said monochrome CRT according to claim 1, wherein step (e) further comprises step (e1), and a new step (i) is added:

(e1) moving said photosensitive medium to place a second line of said photosensitive medium in position for exposure by said light emitted from said face of said monochrome CRT; and (i) moving said photosensitive medium to place a next line of said photosensitive medium in position for exposure by said light emitted from said face of said monochrome CRT.

9. The method for bi-directionally sweeping an electron beam of a monochrome CRT, to illuminate a phosphor area on a face of said monochrome CRT, and to expose a photosensitive medium with light emitted from said face of said monochrome CRT according to claim 8, further comprising the step of:

(j) repeating steps (a) through (i) for a plurality of additional sweeps, illuminating said phosphor area of said monochrome CRT, at a plurality of vertical positions inside said phosphor area, with said electron beam modulated with a plurality of additional rows of dot row data derived from said image, wherein each of said plurality of additional sweeps alternates between said forward direction and said reverse direction, and further wherein each of said plurality of additional rows of dot row data are processed alternately between said forward order and said reverse order, and further wherein said photosensitive medium is moved and exposed at a plurality of additional lines.

10. The method for bi-directionally sweeping an electron beam of a monochrome CRT, to illuminate a phosphor area on a face of said monochrome CRT, and to expose a photosensitive medium with light emitted from said face of said monochrome CRT according to claim 9, further comprising the steps of:

(k) repeating steps (a) through (j) until all of said additional rows of dot row data derived from said image have been processed, and (l) repeating step (k) for a plurality of images.

11. The method for bi-directionally sweeping an electron beam of a monochrome CRT, to illuminate a phosphor area on a face of said monochrome CRT, and to expose a photosensitive medium with light emitted from said face of said monochrome CRT according to claim 8, wherein step (a) further comprises the step (a0) performed before step (a):

(a0) processing image data from an image and breaking it up into rows of dot row data.

12. The method for bi-directionally sweeping an electron beam of a monochrome CRT, to illuminate a phosphor area on a face of said monochrome CRT, and to expose a photosensitive medium with light emitted from said face of said monochrome CRT according to claim 11 wherein step (a0) further comprises the step (a0a) and step (g) is replaced by the following new step (g):

(a0a) reversing the order of said image data in every other row of dot row data; and (g) modulating said electron beam, during said sweeping of step (f), with a second row of dot row data derived from said image, wherein said second row of dot row data is processed in said forward order.

13. The method for bi-directionally sweeping an electron beam of a monochrome CRT, to illuminate a phosphor area on a face of said monochrome CRT, and to expose a photosensitive medium with light emitted from said face of said monochrome CRT according to claim 8, wherein step (a) further comprises the step (a1):

(a1) positioning said electron beam at a left most position in said phosphor area on said face of said monochrome CRT.

14. The method for bi-directionally sweeping an electron beam of a monochrome CRT, to illuminate a phosphor area on a face of said monochrome CRT, and to expose a photosensitive medium with light emitted from said face of said monochrome CRT according to claim 8, wherein step (b) further comprises step (b1), step (c) further comprises steps (c1) and (c2), step (f) further comprises step (f1), and step (g) further comprises steps (g1) and (g2):

(b1) driving said sweeping of said electron beam in said forward direction of step (b) with a first clock;

(c1) controlling said modulation of said electron beam with said first row of dot row data during said sweeping of step (b) with a second clock;

(c2) synchronizing said first clock with said second clock at the beginning of said sweeping and modulating of steps (b) and (c);

(f1) driving said sweeping of said electron beam in said reverse direction of step (f) with said first clock;

(g1) controlling said modulation of said electron beam with said second row of dot row data during said sweeping of step (f) with said second clock; and (g2) synchronizing said first clock with said second clock at the beginning of said sweeping and modulating of steps (f) and (g).

15. The method for bi-directionally sweeping an electron beam of a monochrome CRT, to illuminate a phosphor area on a face of said monochrome CRT, and to expose a photosensitive medium with light emitted from said face of said monochrome CRT according to claim 8, wherein step (b) further comprises step (b0) performed before step (b), step (b) further comprises step (b1), step (f) further comprises step (f0) performed before step (f), and step (f) further comprises step (f1):

(b0) unblanking said monochrome CRT;

(b1) blanking said monochrome CRT at the end of said sweeping of step (b);

(f0) unblanking said monochrome CRT; and (f1) blanking said monochrome CRT at the end of said sweeping of step (f).

16. The method for bi-directionally sweeping an electron beam of a monochrome CRT, to illuminate a phosphor area on a face of said monochrome CRT, and to expose a photosensitive medium with light emitted from said face of said monochrome CRT according to claim 8, wherein step (a) further comprises step (a1), step (e1) further comprises step (e1*a*), and step (i) is eliminated:

(a1) moving said photosensitive medium continuously during steps (b) through (d); and (e1*a*) moving said photosensitive medium continuously during steps (f) through (h).

17. The method for bi-directionally sweeping an electron beam of a monochrome CRT, to illuminate a phosphor area on a face of said monochrome CRT, and to expose a photosensitive medium with light emitted from said face of said monochrome CRT according to claim 8, wherein said photosensitive medium is immediately adjacent to said face of said monochrome CRT.

18. The method for bi-directionally sweeping an electron beam of a monochrome CRT, to illuminate a phosphor area on a face of said monochrome CRT, and to expose a photosensitive medium with light emitted from said face of said monochrome CRT according to claim 8, wherein said light emitted from said face of said monochrome CRT passes through at least one lens before exposing said photosensitive medium.

19. An apparatus for bi-directionally sweeping an electron beam of a monochrome CRT, to illuminate a phosphor area on a face of said monochrome CRT, and to expose a photosensitive medium with light emitted from said face of said monochrome CRT, said apparatus comprising:

a CRT scan drive system for sweeping said electron beam horizontally in a forward direction, and for sweeping said electron beam horizontally in a reverse direction opposite said forward direction; and a CRT data drive system connected to said CRT scan drive system for controlling an intensity of said electron beam to display a first row of dot row data processed in a forward order on said face of said monochrome CRT during said sweeping of said electron beam in said forward direction, and for controlling said intensity of said electron beam to display a second row of dot row data processed in a reverse order opposite said forward order on said face of said monochrome CRT during said sweeping of said electron beam in said reverse direction, wherein said CRT data drive system is synchronized with said CRT scan drive system, and further wherein said first row of dot row data displayed on said face of said monochrome CRT during said sweeping of said electron beam in said forward direction exposes said photosensitive medium with light emitted from said face of said monochrome CRT, and said second row of dot row data displayed on said face of said monochrome CRT during said sweeping of said electron beam in said reverse direction exposes said photosensitive medium with light emitted from said face of said monochrome CRT.

20. The apparatus for bi-directionally sweeping an electron beam of a monochrome CRT, to illuminate a phosphor area on a face of said monochrome CRT, and to expose a photosensitive medium with light emitted from said face of said monochrome CRT according to claim 19, wherein said CRT scan drive system further comprises:

a deflection controller for generating a first plurality of horizontal position values for said sweeping of said electron beam horizontally in said forward direction, and for generating a second plurality of horizontal position values for said sweeping of said electron beam horizontally in said reverse direction, wherein each of said first plurality of horizontal position values and each of said second plurality of horizontal position values represent a specific horizontal location on said phosphor area on said face of said monochrome CRT;

a horizontal look up table connected to an output of said deflection controller, wherein said horizontal look up table converts each of said first plurality of horizontal position values and each of said second plurality of horizontal position values to a plurality of horizontal numerical values, wherein each of said plurality of horizontal numerical values are output from said horizontal lookup table as a horizontal digital signal;

a first digital to analog converter connected to said horizontal digital signal of said horizontal look up table, wherein said first digital to analog converter converts each of said plurality of horizontal numerical values in said horizontal digital signal into a horizontal analog signal; and a CRT horizontal drive connected to said horizontal analog signal of said first digital to analog converter, wherein said horizontal analog signal within said CRT horizontal drive positions said electron beam within said phosphor area on said face of said monochrome CRT at said specific horizontal locations corresponding to said horizontal position values;

wherein, said deflection controller generates said first plurality of horizontal position values for said sweeping of said electron beam horizontally in said forward direction while said CRT data drive system modulates said electron beam with said first row of dot row data on said face of said monochrome CRT, and said deflection controller generates said second plurality of horizontal position values for said sweeping of said electron beam horizontally in said reverse direction while said CRT data drive system modulates said electron beam with said second row of dot row data on said face of said monochrome CRT.

21. The apparatus for bi-directionally sweeping an electron beam of a monochrome CRT, to illuminate a phosphor area on a face of said monochrome CRT, and to expose a photosensitive medium with light emitted from said face of said monochrome CRT according to claim 20, wherein said CRT scan drive system further comprises:

a vertical register for generating a plurality of vertical position values, wherein each of said plurality of vertical position values represent a specific vertical location on said phosphor area on said face of said monochrome CRT, and further wherein, for each said sweeping of said electron beam horizontally in said forward direction, and for each said sweeping of said electron beam horizontally in said reverse direction, one of said plurality of vertical position values is output from said vertical register;

a vertical look up table connected to said output of said vertical register and connected to said output of said deflection controller, wherein said vertical look up table converts each of said one of said plurality of vertical position values to a plurality of vertical numerical values, wherein each of said plurality of vertical numerical values are output from said vertical look up table as a vertical digital signal;

a second digital to analog converter connected to said vertical digital signal of said vertical look up table, wherein said second digital to analog converter converts each of said plurality of vertical numerical values in said vertical digital signal into a vertical analog signal; and a CRT vertical drive connected to said vertical analog signal of said second digital to analog converter, wherein said vertical analog signal within said CRT vertical drive positions said electron beam within said phosphor area on said face of said monochrome CRT at said specific vertical locations corresponding to said vertical position values;

wherein, said deflection controller generates one of said plurality of vertical position values for holding said electron beam in one of said specific vertical locations within said phosphor area on said face of said monochrome CRT for said sweeping of said electron beam horizontally in said forward direction while said CRT data drive system modulates said electron beam with said first row of dot row data on said face of said monochrome CRT, and said deflection controller generates one of said plurality of vertical position values for holding said electron beam in one of said specific vertical locations within said phosphor area on said face of said monochrome CRT for said sweeping of said electron beam horizontally in said reverse direction while said CRT data drive system modulates said electron beam with said second row of dot row data on said face of said monochrome CRT.

22. The apparatus for bi-directionally sweeping an electron beam of a monochrome CRT, to illuminate a phosphor area on a face of said monochrome CRT, and to expose a photosensitive medium with light emitted from said face of said monochrome CRT according to claim 20, wherein said CRT data drive system further comprises:

an image/control buffer memory containing said first row of dot row data for display on said face of said monochrome CRT for said sweeping of said electron beam horizontally in said forward direction, and containing said second row of dot row data for display on said face of said monochrome CRT for said sweeping of said electron beam horizontally in said reverse direction;

an image look up table connected to an output of said image/control buffer memory, wherein said image lookup table converts said first row of dot row data for display on said face of said monochrome CRT for said sweeping of said electron beam horizontally in said forward direction, and converts said second row of dot row data for display on said face of said monochrome CRT for said sweeping of said electron beam horizontally in said reverse direction, into a plurality of numerical values, wherein each of said plurality of numerical values are output from said image lookup table as an image digital signal;

a third digital to analog converter connected to said image digital signal of said image look up table, wherein said third digital to analog converter converts each of said plurality of numerical values in said image digital signal into an image analog signal; and a CRT grid connected to said image analog signal of said third digital to analog converter, wherein said image analog signal within said CRT grid controls said intensity of said electron beam within said phosphor area on said face of said monochrome CRT;

wherein, said image/control buffer memory generates said first row of dot row data for display on said face of said monochrome CRT for said sweeping of said electron beam horizontally in said forward direction, and said image/control buffer memory generates said second row of dot row data for display on said face of said monochrome CRT for said sweeping of said electron beam horizontally in said reverse direction.

23. The apparatus for bi-directionally sweeping an electron beam of a monochrome CRT, to illuminate a phosphor area on a face of said monochrome CRT, and to expose a photosensitive medium with light emitted from said face of said monochrome CRT according to claim 22, further comprising:

a first clock within said CRT scan drive system; and a second clock within said CRT data drive system;

wherein said first clock sends a synchronization signal to said second clock, and said second clock sends said synchronization signal to said image look up table, to determine when to output said plurality of numerical values as said image digital signal, and further wherein said deflection controller sends a horizontal synchronization signal to said first clock and to said second clock to control the start of said sweeping of said electron beam horizontally in said forward direction, and to control the start of said sweeping of said electron beam horizontally in said reverse direction.

24. The apparatus for bi-directionally sweeping an electron beam of a monochrome CRT, to illuminate a phosphor area on a face of said monochrome CRT, and to expose a photosensitive medium with light emitted from said face of said monochrome CRT according to claim 19, further comprising:

a medium drive system connected to said CRT scan drive system and to said CRT data drive system;

a motor connected to said medium drive system; and a medium roll moved by said motor, wherein said photosensitive medium is attached to said medium roll;

wherein a control digital processing unit, connected to said medium drive system, controls said medium drive system which operates said motor, and further wherein said motor moves said medium roll, causing said photosensitive medium to move in relationship to said face of said monochrome CRT.

25. An apparatus for bi-directionally sweeping an electron beam of a monochrome CRT, to illuminate a phosphor area on a face of said monochrome CRT, and to expose a photosensitive medium with light emitted from said face of said monochrome CRT, said apparatus comprising:

a CRT scan drive system comprising
a vertical deflection controller circuit for generating an output voltage for selecting a vertical beam position within said phosphor area;

a horizontal sweep generator circuit for generating a substantially saw tooth voltage wave form for driving a bi-directional horizontal sweep;

a CRT vertical drive connected to an output of said vertical deflection controller circuit wherein said output voltage causes a vertical deflection of said electron beam; and a CRT horizontal drive connected to an output of said horizontal sweep generator circuit, wherein said output voltage causes said electron beam to sweep horizontally in forward and reverse directions at a substantially constant velocity within said phosphor area on said face of said monochrome CRT;

a CRT data drive system for controlling an intensity of said electron beam to display image data on said face of said monochrome CRT;

wherein said CRT vertical drive and said CRT horizontal drive together cause said electron beam to sweep horizontally in a forward direction while said CRT data drive system displays said image data on said face of said monochrome CRT, exposing said photosensitive medium, and cause said electron beam to sweep horizontally in a reverse direction while said CRT data drive system displays said image data on said face of said monochrome CRT exposing said photosensitive medium.

26. The apparatus for bi-directionally sweeping an electron beam of a monochrome CRT, to illuminate a phosphor area on a face of said monochrome CRT, and to expose a photosensitive medium with light emitted from said face of said monochrome CRT according to claim 25, wherein said vertical deflection controller circuit further comprises:

a deflection controller, wherein said deflection controller generates a vertical position;

a vertical look up table connected to an output of said deflection controller, wherein said vertical look up table contains a plurality of numerical values for holding said electron beam at a plurality of vertical positions within said phosphor area on said face of said monochrome CRT;

a first digital to analog converter connected to an output of said vertical look up table; and a first amplifier connected to an output of said first digital to analog converter, wherein said first amplifier outputs said output voltage in a vertical drive signal.

27. The apparatus for bi-directionally sweeping an electron beam of a monochrome CRT, to illuminate a phosphor area on a face of said monochrome CRT, and to expose a photosensitive medium with light emitted from said face of said monochrome CRT according to claim 25, wherein said horizontal sweep generator circuit further comprises:

said deflection controller;

a horizontal look up table connected to an output of said deflection controller, wherein said horizontal look up table contains a plurality of numerical values for sweeping said electron beam horizontally in a forward direction, and a plurality of numerical values for sweeping said electron beam horizontally in a reverse direction;

a second digital to analog converter connected to an output of said horizontal look up table; and a second amplifier connected to an output of said second digital to analog converter, wherein said second amplifier outputs said substantially saw tooth voltage wave form in a horizontal drive signal.

28. The apparatus for bi-directionally sweeping an electron beam of a monochrome CRT, to illuminate a phosphor area on a face of said monochrome CRT, and to expose a photosensitive medium with light emitted from said face of said monochrome CRT according to claim 25, wherein said CRT data drive system further comprises:

an image/control buffer memory containing a portion of said image data for display on said face of said monochrome CRT for said sweeping of said electron beam horizontally in said forward direction, and a portion of said image data for display on said face of said monochrome CRT for said sweeping of said electron beam horizontally in said reverse direction;

an image look up table connected to an output of said image/control buffer memory, wherein said image lookup table contains a plurality of numerical values for translating each position of said portion of image data into a number representative of said intensity of said electron beam for said each position of said portion of said image data for display on said face of said monochrome CRT for said sweeping of said electron beam horizontally in said forward direction, and for translating each position of said portion of image data into a number representative of said intensity of said electron beam for said each position of said portion of said image data for display on said face of said monochrome CRT for said sweeping of said electron beam horizontally in said reverse direction;

a third digital to analog converter connected to an output of said image look up table; and a CRT grid connected to an output of said third digital to analog converter, wherein an electrical signal within said CRT grid controls said intensity of said electron beam within said phosphor area on said face of said monochrome CRT;

wherein, said image/control buffer memory generates a sequence of said image data for display on said face of said monochrome CRT for said sweeping of said electron beam horizontally in said forward direction, and said image/control buffer memory generates a sequence of said image data for display on said face of said monochrome CRT for said sweeping of said electron beam horizontally in said reverse direction.

29. The apparatus for bi-directionally sweeping an electron beam of a monochrome CRT, to illuminate a phosphor area on a face of said monochrome CRT, and to expose a photosensitive medium with light emitted from said face of said monochrome CRT according to claim 28, further comprising:

a first clock within said CRT scan drive system; and a second clock within said CRT data drive system;

wherein said first clock sends a synchronization signal to said second clock, and said second clock sends said synchronization signal to said image look up table to determine when to change said numerical values for translating said each position of said portion of image data into a number representative of said intensity of said electron beam, and further wherein said deflection controller sends a horizontal synchronization signal to said first clock and to said second clock to control the start of said sweeping of said electron beam horizontally in said forward direction, and to control the start of said sweeping of said electron beam horizontally in said reverse direction.

30. The apparatus for bi-directionally sweeping an electron beam of a monochrome CRT, to illuminate a phosphor area on a face of said monochrome CRT, and to expose a photosensitive medium with light emitted from said face of said monochrome CRT according to claim 25, further comprising:

a medium drive system connected to said CRT scan drive system and to said CRT data drive system;

a motor connected to said medium drive system; and a medium roll moved by said motor, wherein said photosensitive medium is attached to said medium roll;

wherein a control digital processing unit, connected to said medium drive system, controls said medium drive system which operates said motor, and further wherein said motor moves said medium roll, causing said photosensitive medium to move in relationship to said face of said monochrome CRT.

* * * * *